United States Patent
El-Hoiydi et al.

(10) Patent No.: US 12,457,460 B2
(45) Date of Patent: *Oct. 28, 2025

(54) METHOD FOR ENSURING SYMMETRIC AUDIO QUALITY FOR HANDS-FREE PHONING

(71) Applicant: Sonova AG, Stafa (CH)

(72) Inventors: Amre El-Hoiydi, Neuchatel (CH); Federico Ferrari, Bern (CH)

(73) Assignee: Sonova AG, Stafa (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,552

(22) Filed: Dec. 1, 2023

(65) Prior Publication Data

US 2024/0107241 A1     Mar. 28, 2024

Related U.S. Application Data

(63) Continuation of application No. 17/817,787, filed on Aug. 5, 2022, now abandoned, which is a continuation of application No. 16/739,593, filed on Jan. 10, 2020, now Pat. No. 11,438,714.

(51) Int. Cl.
  *H04R 25/00* (2006.01)
  *H04W 4/80* (2018.01)

(52) U.S. Cl.
  CPC ......... *H04R 25/554* (2013.01); *H04R 25/502* (2013.01); *H04R 25/505* (2013.01); *H04R 25/558* (2013.01); *H04W 4/80* (2018.02); *H04R 2225/43* (2013.01)

(58) Field of Classification Search
  None
  See application file for complete search history.

(56) References Cited

U.S. PATENT DOCUMENTS

| | | | |
|---|---|---|---|
| 9,480,847 B2 | 11/2016 | Greene et al. | |
| 10,506,361 B1* | 12/2019 | Pallamsetty | H04R 5/02 |
| 11,438,714 B2* | 9/2022 | El-Hoiydi | H04R 25/554 |
| 2008/0318518 A1* | 12/2008 | Coutinho | H04H 20/62 |
| | | | 455/3.06 |
| 2010/0054512 A1* | 3/2010 | Solum | H04B 17/309 |
| | | | 381/315 |
| 2014/0270288 A1 | 9/2014 | Kryzer | |
| 2015/0281985 A1 | 10/2015 | Cavallaro et al. | |
| 2017/0171046 A1* | 6/2017 | Flood | H04B 1/385 |
| 2017/0245040 A1* | 8/2017 | Hankey | H04M 1/05 |
| 2019/0075408 A1 | 3/2019 | Piedras et al. | |
| 2019/0253800 A1 | 8/2019 | Hsieh | |

(Continued)

OTHER PUBLICATIONS

Qualcomm, CSR8670 Product Sheet, http://web.archive.org/web/20180514050902if_/https://www.qualcomm.com/documents/csr8670-product-brief (archived by the WayBackMachine on May 14, 2018) (Year: 2018).*

(Continued)

*Primary Examiner* — Walter F Briney, III
(74) *Attorney, Agent, or Firm* — McDonald Hopkins LLC (57) ABSTRACT

A hearing device includes a processor and a wireless transceiver operatively connected with the processor and configured to connect via a wireless link with a remote device and to exchange bi-directional audio packets with the remote device. The processor is configured to monitor an audio link quality and adapt a transmit power of the hearing device as a function of the audio link quality.

15 Claims, 7 Drawing Sheets

(56) References Cited

U.S. PATENT DOCUMENTS

2019/0349691 A1   11/2019  Ungstrup et al.
2020/0100307 A1*   3/2020  Sridhara .............. H04B 17/318
2020/0252993 A1*   8/2020  Srivastava .............. H04W 4/80

OTHER PUBLICATIONS

Search Report issued in European Patent Application No. 20212804.7 dated Apr. 13, 2021.

* cited by examiner

Front pocket
OK

FIG. 4A

Back pocket Arms up
OK

FIG. 4B

Back pocket Arms down
Not OK

METHOD FOR ENSURING SYMMETRIC AUDIO QUALITY FOR HANDS-FREE PHONING

FIELD OF INVENTION

The following description relates generally to a hearing system and a method for operating a hearing system. More specifically, the following description relates to transmit power control that ensures symmetric audio link quality between a hearing device and a remote device connected wirelessly to the hearing device.

BACKGROUND OF INVENTION

Advances in wireless technology allow wireless communications between hearing devices and remote devices. In such communications, at least one remote device, such as a mobile phone, for example, transmits audio packets, which are received by the hearing device. Due to size and battery life limitations, hearing devices typically radiate wireless signals with a significantly smaller strength than typical audio sources (e.g., a smartphone). A hearing device usually transmits at a power of 0 dBm. However, mobile phones transmit at a power of up to 20 dBm. Because the transmit powers of the hearing device and the mobile phone are substantially different (i.e., asymmetric), when the distance between the hearing device and the mobile phone exceeds a certain range, the quality of the wireless link from the hearing device to the mobile phone deteriorates and the quality of the transmitted audio deteriorates as a result. It is desirable to avoid situations in which the quality of the audio a hearing aid user receives is good, while the quality of the audio received by a far-end user (i.e., another user interacting with the hearing aid user by phone, for example) is bad. Such situations where the audio quality is asymmetric are referred to herein as asymmetric situations. It is desirable to provide control of the transmission power by the hearing device to minimize the occurrence of such asymmetric situations. It is further desirable to provide feedback to the hearing aid user when such an asymmetric situation occurs.

SUMMARY

The present invention provides a hearing system that includes a hearing device and a remote device connected via a wireless link Specifically, the present invention proposes solutions to implement notifications to the user and automatic transmit power control to ensure symmetric audio link quality when the transmit power of the remote device is larger than the transmit power of the hearing device.

In one general aspect, a hearing device may include a processor and a wireless transceiver operatively connected with the processor. The wireless transceiver may be configured to connect via a wireless link with at least one remote device and to exchange bi-directional audio packets with the remote device. The transmit power of the remote device may be larger than the transmit power of the hearing device. The processor may be configured to estimate an audio link packet error rate of a transmission via the wireless link, and generate a notification to the hearing device user when the audio link packet error rate exceeds a pre-determined threshold.

In the hearing device according to the foregoing aspect, the processor may be part of the wireless transceiver.

In the hearing device according to the foregoing aspect, the processor may be further configured to estimate an outgoing audio link packet error rate.

In the hearing device according to the foregoing aspect, the notification may include at least one of a single beep, a beep sequence, artificially degrading an incoming audio quality, or muting incoming audio.

In the hearing device according to the foregoing aspect, the wireless link may follow the Bluetooth specification.

In the hearing device according to the foregoing aspect, the wireless link may follow the Hands-Free Profile ("HFP") of the Bluetooth specification.

In the hearing device according to the foregoing aspect, the wireless link may be configured to use the Enhanced Synchronous connection-oriented ("eSCO") transport option of the Bluetooth specification or the isochronous transport option of the Bluetooth specification.

In the hearing device according to the foregoing aspect, the audio link packet error rate may be estimated by monitoring a number of necessary retransmissions from the hearing device towards the remote device.

In the hearing device according to the foregoing aspect, the audio link packet error rate may be estimated by monitoring acknowledgements transmitted by the remote device related to audio packets received by the remote device.

In another general aspect, a hearing device may include a processor and a wireless transceiver operatively connected with the processor. The wireless transceiver may be configured to connect via a wireless link with at least one remote device and to exchange bi-directional audio packets with the remote device. The processor may be configured to monitor an audio link packet error rate and adapt the transmit power of the hearing device as a function of the audio link packet error rate.

In the hearing device according to the foregoing aspect, the processor may be part of the wireless transceiver.

In the hearing device according to the foregoing aspect, the remote device may be at least one of a mobile phone, a Digital Enhanced Cordless Telecommunications ("DECT") phone, a landline phone, a tablet, or a computer.

In the hearing device according to the foregoing aspect, the processor may be further configured to generate and send a notification when the audio link packet error rate exceeds a pre-determined threshold.

In another general aspect, a method for controlling an audio quality in a hearing device including a processor and a wireless transceiver operatively connected with the processor and configured to connect via a wireless link with a remote device may include estimating an audio link packet error rate of a transmission via the wireless link and adapting the transmit power of the hearing device as a function of the audio link packet error rate.

In the method according to the foregoing aspect, the hearing device may be configured to exchange bi-directional audio packets with the remote device via the wireless link.

In the method according to the foregoing aspect, the estimating the audio link packet error rate may include monitoring a number of necessary retransmissions from the hearing device towards the remote device or monitoring acknowledgements transmitted by the remote device related to audio packets received by the remote device from the hearing device.

In the method according to the foregoing aspect, the method for controlling an audio quality in a hearing device may further include generating and sending a notification when the audio link packet error rate exceeds a pre-determined threshold.

In the method according to the foregoing aspect, the notification may include at least one of a single beep, a beep sequence, artificially degrading an incoming audio quality, or muting incoming audio.

In another general aspect, a method for controlling an audio quality in a hearing device, including a processor and a wireless transceiver operatively connected with the processor and configured to connect via a wireless link with a remote device, may include estimating an audio link packet error rate of a transmission via the wireless link and generating and sending a notification when the outgoing audio link packet error rate exceeds a pre-determined threshold.

In the method according to the foregoing aspect, the notification may include at least one of a single beep, a beep sequence, artificially degrading an incoming audio quality, or muting incoming audio.

Other features and aspects may be apparent from the following detailed description, the drawings, and the claims.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Example embodiments that incorporate one or more aspects of the apparatus and methodology are described and illustrated in the drawings. These illustrated examples are not intended to be a limitation on the present disclosure. For example, one or more aspects of the disclosed embodiments can be utilized in other embodiments and even other types of devices. Moreover, certain terminology is used herein for convenience only and is not to be taken as a limitation.

Within the context of the following description, hearing devices (such as hearing aids, hearing prostheses, cochlear implants, earphones, etc.) are specifically utilized by individuals to hear audio from another device or from the user's surroundings and may be used, for example in order to compensate hearing loss and/or improve hearing ability. A pair of hearing devices, one intended to be worn at the left and the other at the right ear of the user, which are linked to one another is referred to as a binaural hearing system. Different styles of hearing devices exist in the form of behind-the-ear (BTE), in-the-ear (ITE), completely-in-canal (CIC), or Invisible-in-the-Canal (IIC) types, as well as hybrid designs consisting of an outside-the-ear part and an in-the-ear part, the latter typically including a receiver (i.e., a miniature loudspeaker), therefore commonly termed receiver-in-the-ear (RITE), receiver-in-canal (RIC), or canal-receiver-technology (CRT) hearing devices. Depending on the severity and/or cause of the user's hearing loss, other electro-mechanical output transducers, such as a bone-anchored vibrator, a direct acoustic cochlear simulator (DACS) or cochlear implant (CI) can be employed instead of a receiver. Other uses of hearing devices pertain to augmenting the hearing of normal hearing persons, for instance by means of noise suppression, to the provision of audio signals originating from remote sources, e.g., within the context of audio communication, and for hearing protection.

Hearing devices with multiple separate units, such as one intended to be worn at the left and the other at the right ear of the user, for example, allow communication between the two hearing device units, as well as communication with other devices, such as a mobile phone or a portable audio player. This communication may take place via a remote auxiliary unit, such as a hub, that acts as a communication relay. Advances in wireless technology allow direct wireless communications between a hearing device and remote devices, such as mobile phones (e.g., smartphone, such as iPhone, Android, Blackberry, etc.), Digital Enhanced Cordless Telecommunications ("DECT") phones, landline phones, tablets, media players (e.g., iPod, MP3 player, etc.), computers (e.g., desktop or laptop, PC, Apple computer, etc.), audio/video (A/V) receivers that can be part of a home entertainment or home theater system, for example, a car audio system or circuitry within the car, remote control, an accessory electronic device, a wireless speaker, or a smart watch.

Figure 1:
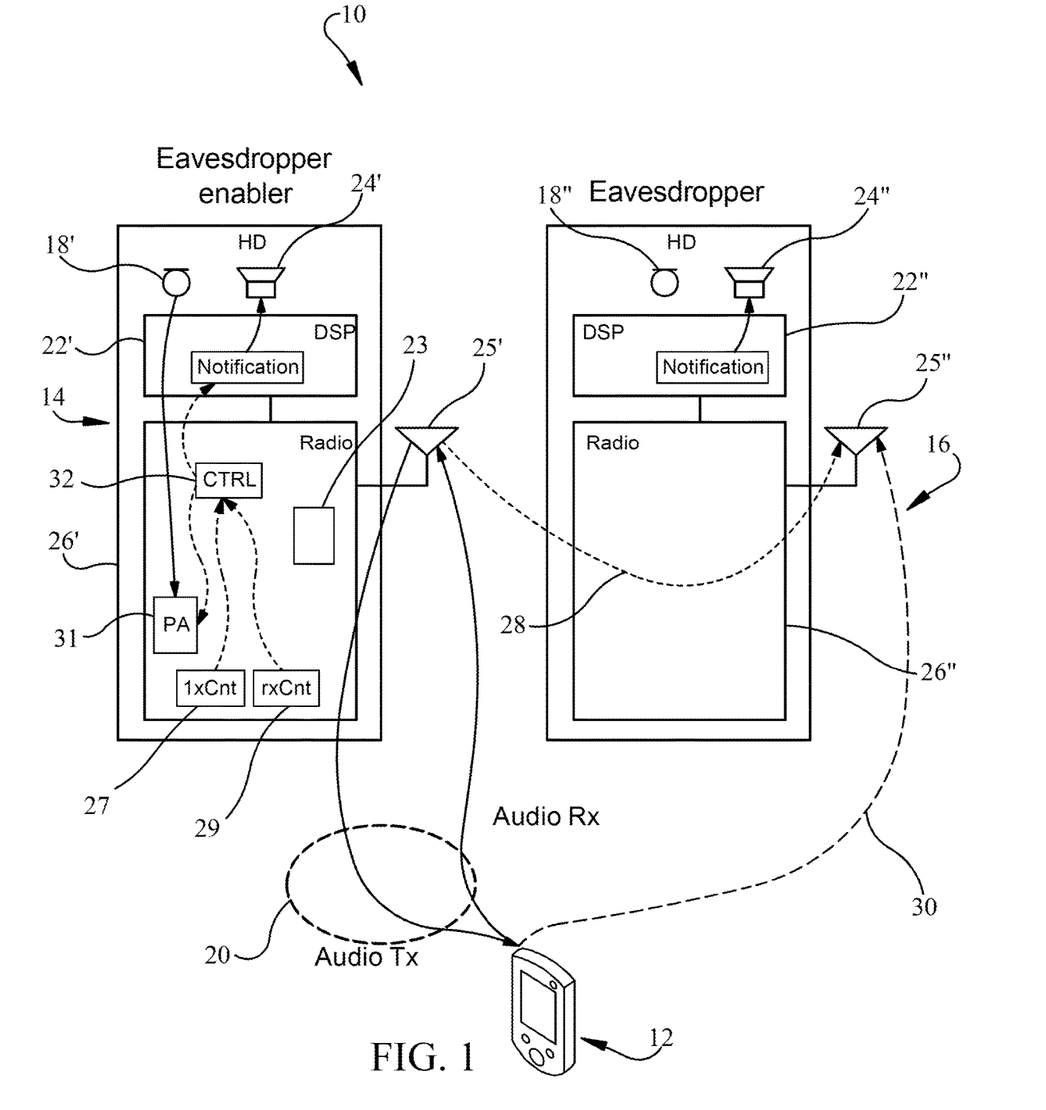
FIG. 1 is a schematic diagram illustrating a hearing system with a remote device, an eavesdropper enabler hearing device (also called participant hearing device), and an eavesdropper hearing device, according to an embodiment.

An example schematic diagram of such wireless communications system is illustrated in FIG. 1. The wireless communications system 10 can include a remote device 12 (illustrated as a mobile phone in FIG. 1, but not limited thereto), a first hearing device 14, and a second hearing device 16. However, embodiments are not limited thereto and other configurations are contemplated. For example, the wireless communications system 10 can include a remote device 12 and only one hearing device. In operation, the remote device 12 can wirelessly transmit audio packets, which can be received by the first hearing device 14 and the second hearing device 16. The audio packets can be transmitted and received through wireless links using wireless communication protocols, such as Bluetooth or Wi-Fi® (based on the IEEE 802.11 family of standards of the Institute of Electrical and Electronics Engineers), or the like, as well as other radio frequency (RF) communication protocols, for example. Among such point-to-point wireless communications are protocols that conform to the Bluetooth specification promulgated by the Bluetooth Special Interest Group of Bellevue, Washington. The Bluetooth Core Specification specifies both the Bluetooth Classic variant of Bluetooth, also known as Bluetooth Basic Rate/Enhanced Data Rate™ (Bluetooth BR/EDR™) as well as Bluetooth Low Energy variant of Bluetooth, also known as Bluetooth LE, or BLE. Advances in integrated chip design have made it possible to develop a chip that supports both Bluetooth Classic and Bluetooth Low Energy and that has a size and a power consumption performance that is suitable for the capabilities of hearing devices. Because Bluetooth BR/EDR™ is generally a point-to-point communication, it may be desirable for one of two hearing devices worn by a user to eavesdrop an audio stream to hear audio in stereo while the other hearing device maintains a point-to-point Bluetooth BR/EDR™ connection. Specifically, a primary hearing device may establish a wireless connection with a remote device and begin streaming music, and a secondary audio device can eavesdrop the audio stream (e.g., without a wireless connection to the remote device). The primary hearing device can receive audio packets for the left stereo channel and the secondary hearing device can eavesdrop audio packets for the right stereo channel (or vice versa). Accordingly, A2DP eavesdropping allows the hearing device user to listen to an audio stream in stereo despite Bluetooth BR/EDR™ being a point-to-point connection.

In the Bluetooth system, when a hearing device is connected to a mobile phone, it is up to the mobile phone to control the transmit power of the hearing device. If the reception power is too low, the mobile phone asks, via the Bluetooth protocol, to increase the transmit power of the hearing device. If the reception power is too high, the mobile phone asks, via the Bluetooth protocol, to decrease the transmit power of the hearing device.

The Bluetooth system uses a closed loop power control. Each side can ask the other side to increase or decrease the transmitted power, with the goal to receive the radio signal in the best power zone (e.g., not to weak and not too strong).

The first hearing device 14 and the second hearing device 16 can be electro-acoustic transducers configured to convert audio information into sound. Such electro-acoustic transducers can include but are not limited to earphones, ear buds, hearing aids, speakers, headphones, etc., for example. The first hearing device 14 may be configured as a left channel speaker for a stereo channel and the second hearing device 16 may be configured as a right channel speaker for a stereo channel, or vice-versa.

As shown in FIG. 1, each of the first hearing device 14 and the second hearing device 16 can include an input microphone system 18', 18" configured to capture an audio signal and convert the audio signal into an electrical input signal. Although the microphone system shown in FIG. 1 includes only one input microphone 18', 18", the microphone system can include more than one input microphone. The microphone 18', 18" may be directional, i.e., may pick up most sounds in front a person wearing the microphone, or omni-directional, i.e., may pick up sounds from all directions. In addition to the input microphone 18', 18", further receiving means for receiving signals may be present, such as a telecoil receiver, a receiving unit including an antenna for receiving wirelessly transmitted signals, etc. For example, a streamed audio input signal (such as a phone call or music) can be received from a streaming input source, such as the remote device 12, for example, by a wireless connection, such as wireless point-to-point link 20, for example.

The electrical input signals obtained from the input microphone 18', 18" can be processed by a signal processor 22', 22" that can convert the electrical input signals into digital signals that can be processed further to obtain an electrical output signal. A desired electrical input signal can be the electrical input signal obtained by the input microphone 18', 18", the streamed audio input signal, or a mix of both input signals. The electrical output signal can be converted into an acoustic output signal by a receiver 24', 24" (also known as a "speaker") and can be emitted into the remaining volume between the user's eardrum and the earpiece or the in-the-ear-canal-component of the hearing device.

The signal processor 22', 22" may be a single digital signal processor or may be made up of different, potentially distributed processor units, preferably including at least one digital signal processor unit. The signal processor 22', 22" can include one or more of a microprocessor, a microcontroller, a digital signal processor (DSP), an application specific integrated circuit (ASIC), a field-programmable gate array (FPGA), discrete logic circuitry, or the like, appropriately programmed with software and/or computer code, or a combination of special purpose hardware and programmable circuitry. The signal processor 22', 22" may be further adapted to differentiate sounds, such as speech and background noise, and process the sounds differently for a seamless hearing experience. The signal processor 22', 22" can further support cancellation of feedback or noise from wind, ambient disturbances, etc.

The signal processor 22', 22" can further include memory (not shown in FIG. 1) and may store tables with predetermined values, ranges, and thresholds, as well as program instructions that may cause the signal processor 22', 22" to access the memory, execute the program instructions, and provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The signal processor 22', 22" can further include one or more analog-to-digital (A/D) and digital-to-analog (D/A) converters for converting various analog inputs to the signal processor 22', 22", such as analog input from the microphone 18', 18", for example, in digital signals and for converting various digital outputs from the signal processor 22', 22" to analog signals representing audible sound data which can be applied to the speaker 24', 24", for example.

Each of the first hearing device 14 and the second hearing device 16 can be configured to wirelessly receive audio or other signals from each other, from the remote device 12, or from another device, component or system, such as a remote hearing device controller, a hearing loop system, an audio link device, or a streaming device, for example. Each of the first hearing device 14 and the second hearing device 16 can include a wireless communication unit, such as a transceiver 26', 26" configured to receive and optionally to transmit wireless signals to other devices. For example, each of the first hearing device 14 and the second hearing device 16 may receive wireless audio signals and/or control signals from a remote device via an antenna 25', 25", and convey them to the signal processor 22', 22" or to each other. In certain embodiments, the transceiver 26', 26" may be a part of the signal processor 22', 22". Specifically, the signal processor 22', 22" can employ a Bluetooth receiver, an audio codec that provides the audio signal conveyed by a remote device, such as the remote device 12, for example, in digitized form, and a decoder that decodes the digitized audio signal. Alternatively, the transceiver 26', 26" may include its own Bluetooth on-board signal processor 23. As illustrated in FIG. 1, the transceiver 26' can include a transmit counter (txCnt) 27 and a receive counter (rxCnt) 29, which may count how many attempts have occurred to transmit and receive an audio packet between the first hearing device 14 and the remote device. The transceiver 26' can also include a power amplifier 31 that may be configured to amplify the signal from the microphone 18'. The transceiver 26' can further include a controller 32 that can receive the respective counts from the transmit counter (txCnt) and the receive counter (rxCnt), send a control signal to the amplifier to amplify an audio signal, or send notifications to the first hearing device 14 and the second hearing device 16 regarding the quality of the wireless link 20 based on the counts from the transmit counter (txCnt) and the receive counter (rxCnt), as described below. The controller 32 may be a single digital signal processor or may include one or more of a microprocessor, a microcontroller, a digital signal processor (DSP), an application specific integrated circuit (ASIC), a field-programmable gate array (FPGA), discrete logic circuitry, a memory, or the like. The transceiver 26" can have a similar configuration, particularly if the roles of the hearings devices 14 and 16 are reversed, and the second hearing device 16 performs the functions of a participant/eavesdropper enabler.

Figure 2:
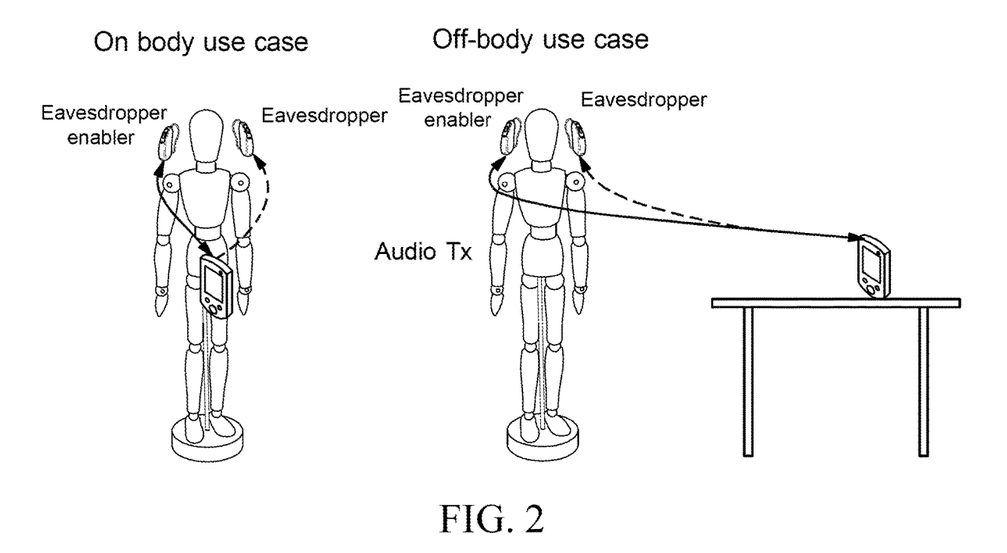
FIG. 2 is a schematic diagram illustrating an on-body (front or back pocket) and off-body use scenarios of the hearing system of FIG. 1.
Figure 3:
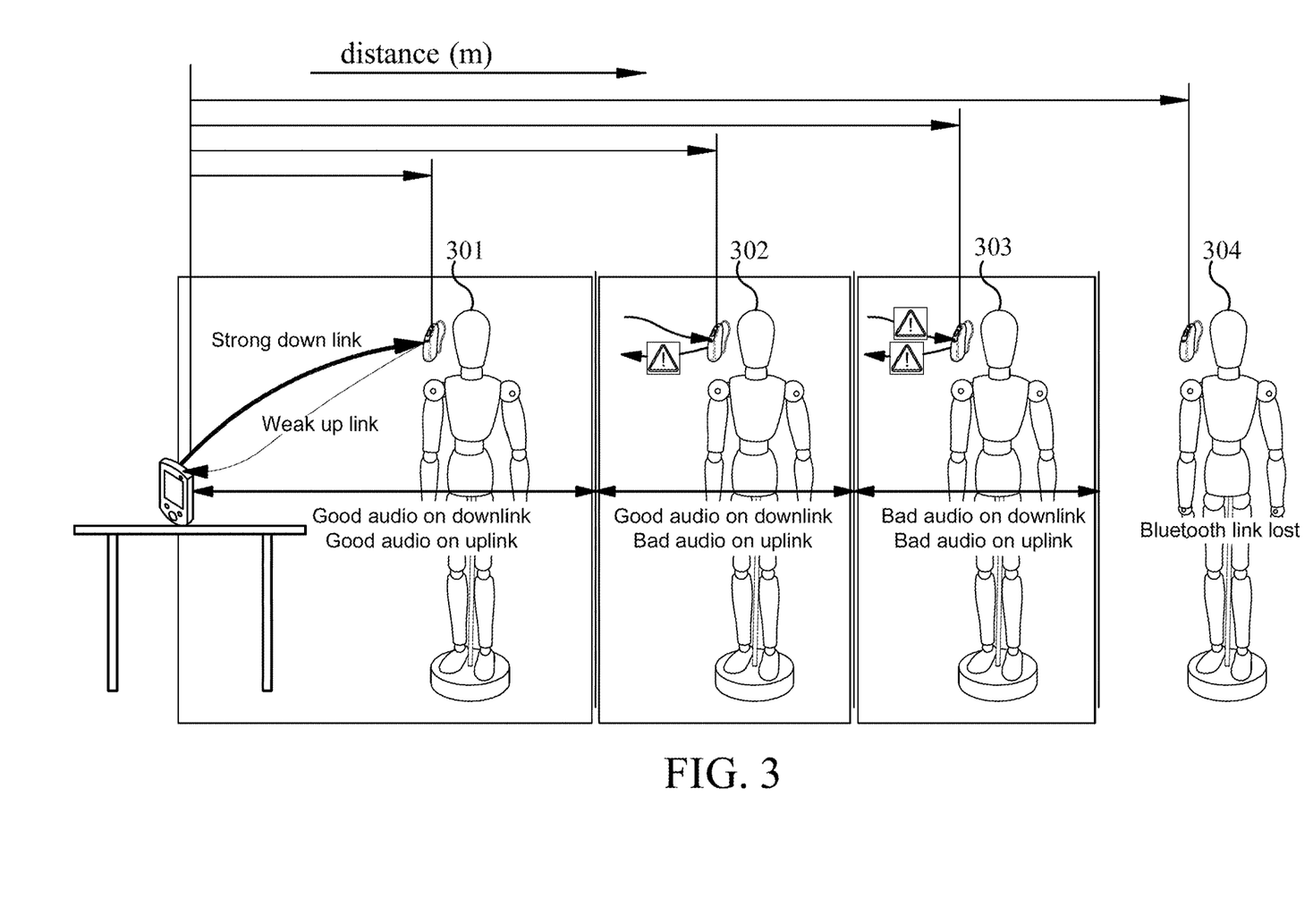
FIG. 3 is a schematic diagram illustrating usage range zones with different quality of the audio on the uplink and downlink of the hearing system of FIG. 1, according to an embodiment.

Modern hearing devices can be used to make and receive telephone calls and stream audio using a remote device, such as mobile phone, via a wireless link, using a bi-directional hands-free profile. This link can also be used for voice communication with a digital assistant on the mobile phone. The mobile phone can be worn by the user on-body (e.g., in a front pocket, back-pocket, or in a bag), or off-body (e.g., on a table or desk), as illustrated in FIG. 2. A hearing device usually transmits at a power of 0 dBm. At the same time, current mobile phones may transmit at a power of up to 20 dBm and the power level increases with each new generation of mobile phones. Because the transmit powers of the hearing device and the mobile phone are different (e.g., asymmetric), when the distance between the hearing device and the mobile phone exceeds a certain range, the wireless link quality can deteriorate and the quality of the transmitted audio can deteriorate as a result. For example, as illustrated in FIG. 3, certain range zones can result in good audio for both the uplink (e.g., the wireless link from the hearing device to the mobile phone) and downlink (e.g., the wireless link from the mobile phone to the hearing device) (user 301), in good audio on the downlink only and bad audio on the uplink (user 302), and with bad audio on both the uplink and downlink (user 303). These differences between the uplink and the downlink in the situations shown for user 302, for example, can cause wireless link asymmetry that can result in bad audio on the uplink and/or the downlink (i.e., on the bad wireless link). In the worst case scenario, the Bluetooth link may be completely lost (user 304).

Figure 4A:
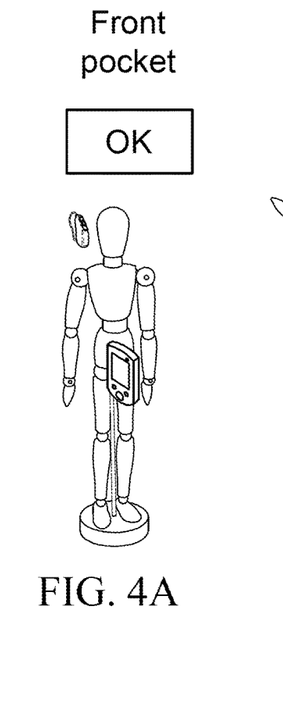
FIGS. 4A-4C are schematic diagrams illustrating quality of the audio and usage range zones depending on the location of the hearing system of FIG. 1, according to an embodiment.
Figure 4B:
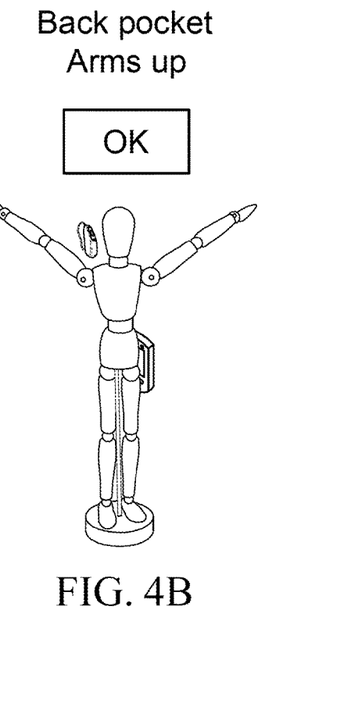
Figure 4C:
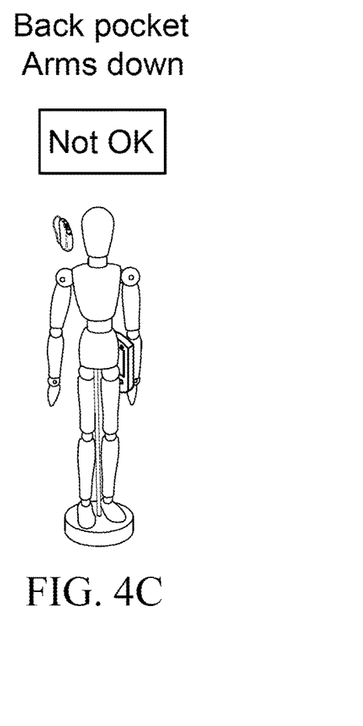

In addition, even if mobile phone is worn by the user on-body, the location of the mobile phone can still affect the wireless link, as illustrated in FIGS. 4A-4C. For example, when the mobile phone is worn by the user in the front pocket, the link quality remains acceptable (FIG. 4A). When the mobile phone is worn by the user in the back pocket, the link quality depends on the position of the user's arms. Specifically, when the mobile phone is worn by the user in the back pocket and the user's arms are up or away from the user's body, the link quality remains acceptable (FIG. 4B). However, when the mobile phone is worn by the user in the back pocket and the user's arms are down or close to the user's body, the link quality deteriorates (FIG. 4C).

Figure 5:
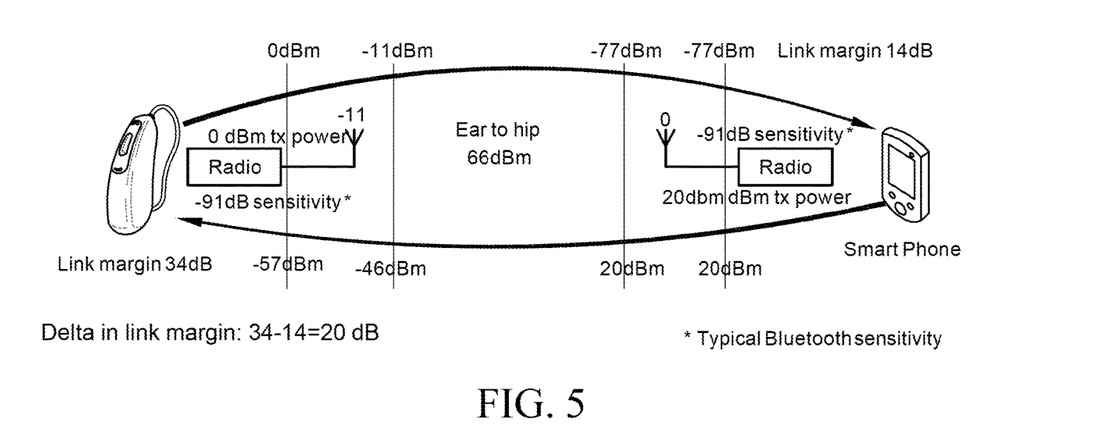
FIG. 5 is a schematic diagram illustrating audio link asymmetry of the hearing system of FIG. 1, according to an embodiment.

Some hearing devices are susceptible to wireless link asymmetry due to the different (e.g., asymmetric) transmit powers of the hearing device and the mobile phone, when the distance between the hearing device and the mobile phone exceeds a certain range. The amount of link asymmetry can be calculated with the following formula: $A=(PhoneTxPower-HearingAidSensitivity)-(HearingAidTxPower-PhoneSensitivity)=(20-(-91))-(0-(-91))=20$, where the value −91 dBm for the sensitivity of the hearing aid and of the mobile phone is a typical sensitivity for Bluetooth chips. The wireless link asymmetry is illustrated in FIG. 5. The hearing system described herein can control automatically (e.g., without manual intervention by the user) any asymmetry of the wireless links between the hearing device and the remote device, thereby improving the audio quality.

Turning back to FIG. 1, it may be desirable to transmit the sound coming from the mobile phone 12 into both ears of the user. The first (e.g., left) hearing device 14 can be connected to the remote device 12 via the wireless point-to-point link 20, which can conform to the Bluetooth protocol. A separate Bluetooth or a proprietary wireless link 28 may be formed between the first hearing device 14 and the second hearing device 16 for network management purposes and/or to coordinate actions between the first hearing device 14 and the second hearing device 16 concerning audio received from the remote device 12, for example. The first hearing device 14 can receive audio packets directly from the remote device 12 via the wireless link 20. The second (e.g., right) hearing device 16 can be configured to eavesdrop on (that is, can listen in on or observe) the Bluetooth link 20 between the mobile phone 12 and the first hearing device 14 to also receive the audio packets sent from the remote device 12 by picking up the audio sent by the mobile phone 12 to the first hearing device 14 and playing back this sound. For example, the second hearing device 16 can be configured to eavesdrop on the Bluetooth link 20 between the mobile phone 12 and the first hearing device 14 via a communication link 30. In other words, the first hearing device 14 can be configured as a participant or an eavesdropper enabler (EDE) and the second hearing device 16 can be configured as an eavesdropper (ED). The eavesdropper and participant roles are not necessarily limited to the second hearing device 16 and the first hearing device 14, as illustrated in FIG. 1, and can be reversed. For example, the first (left) hearing device 14 could be the eavesdropper and the second (right) hearing device 16 could be the participant.

The Hands-Free Profile ("HFP") and the Advanced Audio Distribution Profile ("A2DP") of the Bluetooth specification may both be utilized for the point-to-point links 20 and 28. When HFP is utilized, the remote device 12 can send incoming audio to the first hearing device 14. The first hearing device 14 renders the received incoming audio. The second hearing device 16 can eavesdrop the mono (i.e., monaural) incoming audio link and also renders the received incoming audio. When A2DP is utilized, the first hearing device 14 receives a stereo (i.e., stereophonic) signal and renders only the left audio channel. The second hearing device 16 can eavesdrop on the stereo signal and render the right audio channel.

The first hearing device 14 can be configured to transmit an outgoing audio packet (e.g., voice for a telephone call or voice commands to applications stored on the mobile phone 12) to the mobile phone 12. The outgoing audio packet can be transmitted via the wireless point-to-point link 20, which conforms to a wireless communication protocol such as Bluetooth BR/EDR™, Bluetooth Low Energy™, a proprietary communication (e.g., binaural communication protocol between hearing aids or bimodal communication protocol between a hearing aid and hearing device), ZigBee™, Wi-Fi™, or an Industry of Electrical and Electronic Engineers (IEEE) wireless communication standard (e.g., 802.11), for example. The wireless link 20 may also be configured for bi-directional communications allowing transmission and receipt of audio packets, as well as transmission and receipt of acknowledgements (ACK) by the hearing devices 14, 16 that an audio packet was successfully received, for example. The wireless link 20 may further be configured for bi-directional communications between the first hearing device 14 and the mobile phone 12, allowing not only transmission and receipt of audio packets between the first hearing device 14 and the remote device 12, but also acknowledgements by the mobile phone 12 that an audio packet from the first hearing device 14 was successfully received. The bi-directional link 20 can minimize the number of audio packet re-transmissions when an audio packet has been received and no retransmission is necessary. When an audio packet from the remote device 12 is not received or is received corrupted by the first hearing device 14, the first hearing device 14 can transmit an error signal across the wireless link 20 to the remote device 12 to request retransmission of the audio packet. Such an error signal is called a negative acknowledge (NAK) in the Bluetooth specification, in opposition to the positive acknowledge (ACK). When an audio packet from the first hearing device 14 is not received or is received corrupted by the remote device 12, the remote device 12 can transmit an error signal across the wireless link 20 to the first hearing device 14 to request retransmission of the audio packet. When an audio packet is not received or is received corrupted by the second hearing device 16, the second hearing device 16 can transmit an error signal via the separate wireless link 28 to the first hearing device 14 to be forwarded to the remote device across the wireless link 20 requesting retransmission of the audio packet.

When an audio packet is not received or is received corrupted by the mobile phone 12, the mobile phone 12 can transmit an error signal across the wireless link 20 to the first hearing device 14 to request retransmission of the audio packet.

In a point-to-point protocol, a packet is formatted in 8-bit bytes, and can include control information and data, which is also known as the payload. Control information can provide data for delivering the payload, such as source and destination network addresses, error detection codes, and sequencing information, for example Typically, control information can be found in the packet header. An audio packet can be considered corrupted if at least one bit is erroneous. In digital transmission, the number of bit errors is the number of received bits of a data stream over a communication channel that has been altered due to noise, interference, distortion, or bit synchronization errors. A packet error rate (PER) (also known as packet error rate) of a transmission via the point-to-point protocol (e.g., the wireless link) is the number of incorrectly received data packets divided by the total number of received packets. The packet error rate (PER) is used to test and measure the performance of a receiver.

Because the transmit powers of the first hearing device 14 and the mobile phone 12 are different (e.g., asymmetric), when the distance between the first hearing device 14 and the mobile phone 12 exceeds a certain range, the quality of the wireless link 20 can deteriorate. As a result of the deteriorated quality of the wireless link 20, the audio packets transmitted from the first hearing device 14 to the mobile phone 12 can be corrupted or not received at all, and the quality of the audio transmitted from the first hearing device 14 to the mobile phone 12 can deteriorate. It may be desirable to notify the user of the hearing device of the deteriorated quality of the wireless link and to control the transmit power of the hearing device when a wireless link with deteriorated quality is detected.

In one embodiment, the hearing system 10 can be configured to notify the user about wireless link asymmetry when a bad audio state is detected.

As discussed above, the transceiver 26', 26" of the first hearing device 14 and the second hearing device 16, respectively, may include its own Bluetooth on-board signal processor 23. In this embodiment, the processor 23 of the transceiver 26' of the first hearing device 14 can be configured to measure or estimate the outgoing packet error rate (PerTx) on the wireless link 20 between the first hearing device 14 and the mobile phone 12. Alternatively, the processor 22' of the first hearing device 14 can be configured to measure or estimate the outgoing packet error rate (PerTx). As yet another alternative, the outgoing packet error rate (PerTx) on the wireless link 20 can be estimated by a processor of the mobile phone 12. The PerTx measurement is performed on the hearing device that is connected bi-directionally with the mobile phone 12. In the example illustrated in FIG. 1, the hearing device that is connected bi-directionally with the mobile phone 12 is the first hearing device 14. Specifically, when the hearing device 14 is connected to the mobile phone 12, the processor 23 of the transceiver 26' can be configured to compute the outgoing packet error rate PerTx by monitoring the number of the retransmissions from the first hearing device 14 towards the mobile phone 12. Retransmissions from the first hearing device 14 towards the mobile phone 12 are performed when an audio packet from the first hearing device 14 is not received or is received corrupted by the remote device 12. In this situation, the remote device 12 can transmit an error signal across the wireless link 20 to the first hearing device 14 to request retransmission of the audio packet. Alternatively, because the wireless link 20 may be configured for transmission of acknowledgements by the mobile phone 12 that an audio packet from the first hearing device 14 was successfully received, the first hearing device 14 may retransmit the audio packet to the remote device when the first hearing device 14 has not received an acknowledgment from the mobile phone 12 of a successful receipt of the audio packet.

Figure 6:
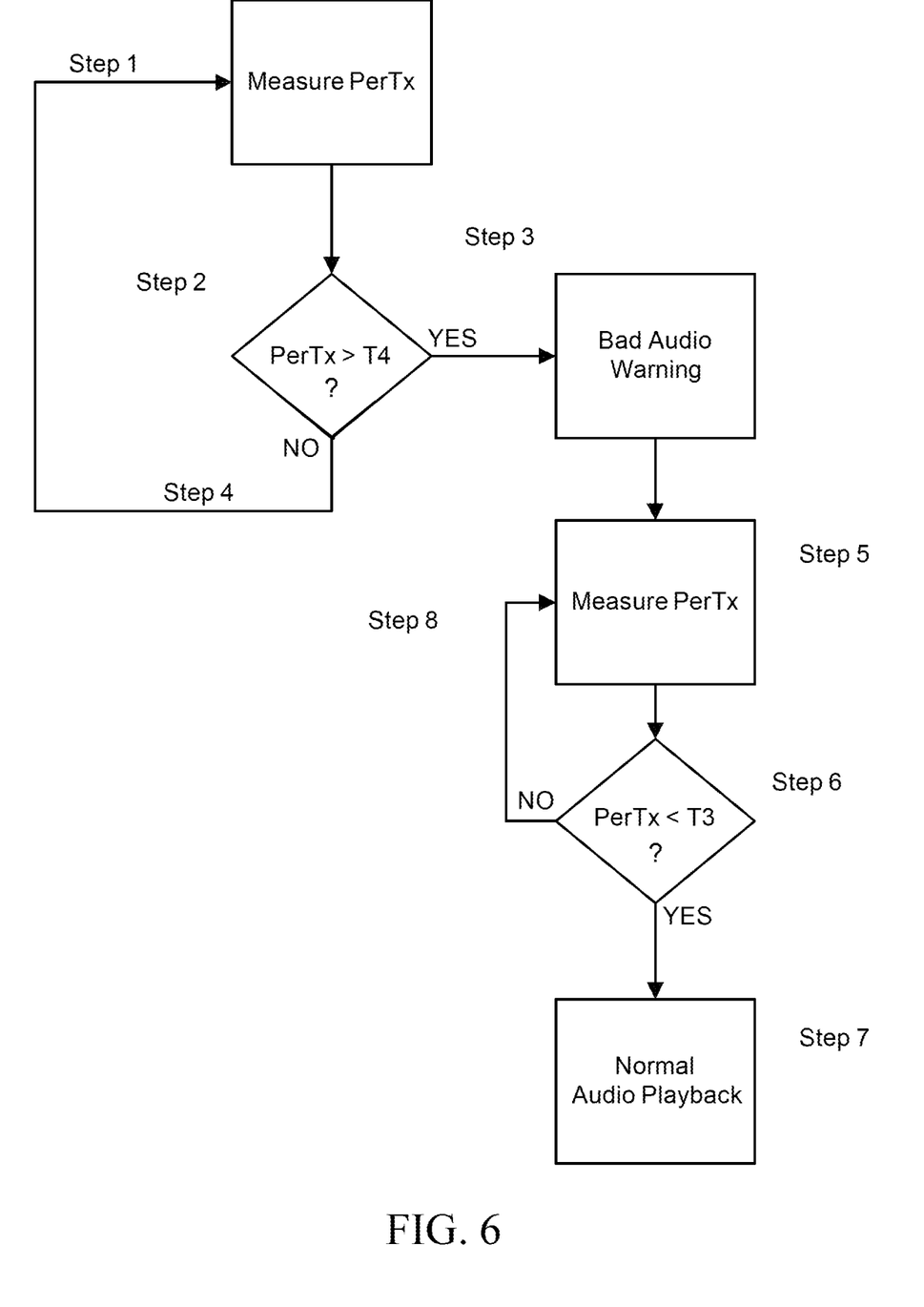
FIG. 6 is a flowchart illustrating a process of notifying the user of the hearing system of FIG. 1 of a bad audio link, according to an embodiment.

As illustrated in FIG. 6, in Step 1, the processor 23 of the transceiver 26' measures the outgoing packet error rate PerTx.

In Step 2, the processor 23 of the transceiver 26' checks whether the outgoing packet error rate PerTx is above a threshold T4 ("bad threshold"). When the outgoing packet error rate PerTx is above a certain threshold, the quality of the audio link has deteriorated to the point that the audio is not understandable and the wireless link is considered bad. The audio error rate above which audio is not understandable is typically around 20%, but may vary depending on context. A Bluetooth Hands-Free Profile ("HFP") audio link may be configured to use two or three transmit attempts $N_T$. Sometimes, even if a wireless link is negotiated by the mobile phone to use three transmits attempts, the third transmit attempt may not be listened to by the mobile phone.

Therefore, typically only two transmit attempts are available even if the link allows for a third transmit.

With a Modified SBC Codec (mSBC) for Bluetooth devices, at 1 Mbps, one audio frame of 7.5 ms is transmitted in two radio packets. The Average Frame Error Rate (FER) can be calculated with the formula: $FER=1-(1-PER^{\wedge}N_T)^{\wedge}2$.

With a Continuously variable slope delta modulation (CVSD), at 1 Mbps, one audio frame of 3.75 ms is transmitted in one radio packet. The Average Frame Error Rate (FER) can be calculated with the formula: $FER=PER^{\wedge}N_T$, where PER is the outgoing packet error rate PerTx.

Assuming that the audio error rate above which audio is not understandable is 20%, the bad audio state can be entered if the outgoing packet error rate PerTx is above $1-(1-0.2)^{\wedge}(\frac{1}{2}))^{\wedge}(\frac{1}{2})=32\%$ and $(1-(1-0.2)^{\wedge}(\frac{1}{2}))^{\wedge}(\frac{1}{3})=47\%$ with two and three transmit attempts, respectively. Considering the case of two transmit attempts, the bad audio threshold T4 can preferably be chosen at T4=0.32.

Turning back to FIG. 6, in Step 3, if the outgoing packet error rate PerTx is above the threshold T4, the processor 22' starts generating a bad audio warning to the user. Alternatively, the bad audio warning may be generated by the processor 23 of the transceiver 26'. As yet another alternative, the bad audio warning may be generated by the processor of the mobile phone 12.

In Step 4, if the outgoing packet error rate PerTx is not above the threshold T4, the processor 23 of the transceiver 26' measures again the outgoing packet error rate PerTx in Step 1.

The bad audio warning can be a notification to the user of the bad outgoing audio link by playing one or more warning beeps (e.g., a beep sequence), artificially degrading the incoming audio link quality, or muting the incoming audio. Degrading the incoming audio link quality may be achieved for example via dropping a certain percentage (such as 20%, for example) of incoming audio packet. The goal of all of these warnings is to notify the user that the wireless link 20 is weak, which should prompt the user to bring the mobile phone 12 closer to the hearing device 14. The beep notification can be explicit, while the degrading and/or muting the incoming audio link quality can be intuitive. Although the PerTx measurement is made on the hearing device that is connected bi-directionally with the mobile phone (e.g., the first hearing device 14), the notification about bad audio state can be made on both hearing devices, for example, by using a message transmitted via the wireless link 28 between the first and the second hearing devices that triggers the notification (as shown in FIG. 1). The bad audio notification is preferably applied during the entire time when the outgoing audio link is assumed to be in the bad audio state. Alternatively, the warning, especially if it is a beep sequence, may be generated only when entering the bad audio state.

In Step 5, during bad audio state, the processor 23 of the transceiver 26' measures again the outgoing packet error rate PerTx, and in Step 6, the processor 23 of the transceiver 26' checks whether the outgoing packet error rate PerTx is below another threshold T3 (the "good threshold"), which is lower than the threshold T4. If the outgoing packet error rate PerTx is below the good audio threshold T3, in Step 7 the processor 23 of the transceiver 26' resumes normal audio playback.

The value of the good audio threshold T3 can be chosen sufficiently below the bad audio threshold T4 to avoid rapid toggling between good and bad audio. At 20% outgoing packet error rate PerTx, the audio error rate is $1-(1-0.2^{\wedge}2)^{\wedge}2=7.8\%$ with two transmits and $1-(1-0.2^{\wedge}3)^{\wedge}2=1.6\%$ with three transmits. At 7.8% audio error rate, the audio is understandable and a good audio state can be entered. Accordingly, the present embodiment can select T3 to be 20%.

In Step 8, when the outgoing packet error rate PerTx is not below the threshold T3, the process continues with the processor 23 of the transceiver 26' measuring again the outgoing packet error rate PerTx in Step 5.

In another embodiment, the hearing system 10 can be configured to automatically adapt the transmitted power of the hearing device as a function of the outgoing audio link packet error rate.

The conducted transmit power is the transmit power that a radio frequency (RF) transmitter (e.g., radio chip) produces at its output or the transmit power of the radio chip measured when a power meter is connected to the radio chip in place of the antenna. The effective radiated power (ERP) or the effective isotropic radiated power (EIRP), also known as a radiated power, is the effective power produced at the output of the radio chip including the ability of the antenna to direct that power in a certain direction or in the direction of the antenna's strongest beam, respectively. The conducted transmit power is relevant for link asymmetry, since the effect of the antenna is symmetric on both the transmit and receive paths.

In the present embodiment, the hearing device can decide autonomously whether to use a higher or a lower transmit power. This embodiment has the advantage of minimizing the power consumption in the hearing device via using a lower transmit power whenever possible.

Figure 7:
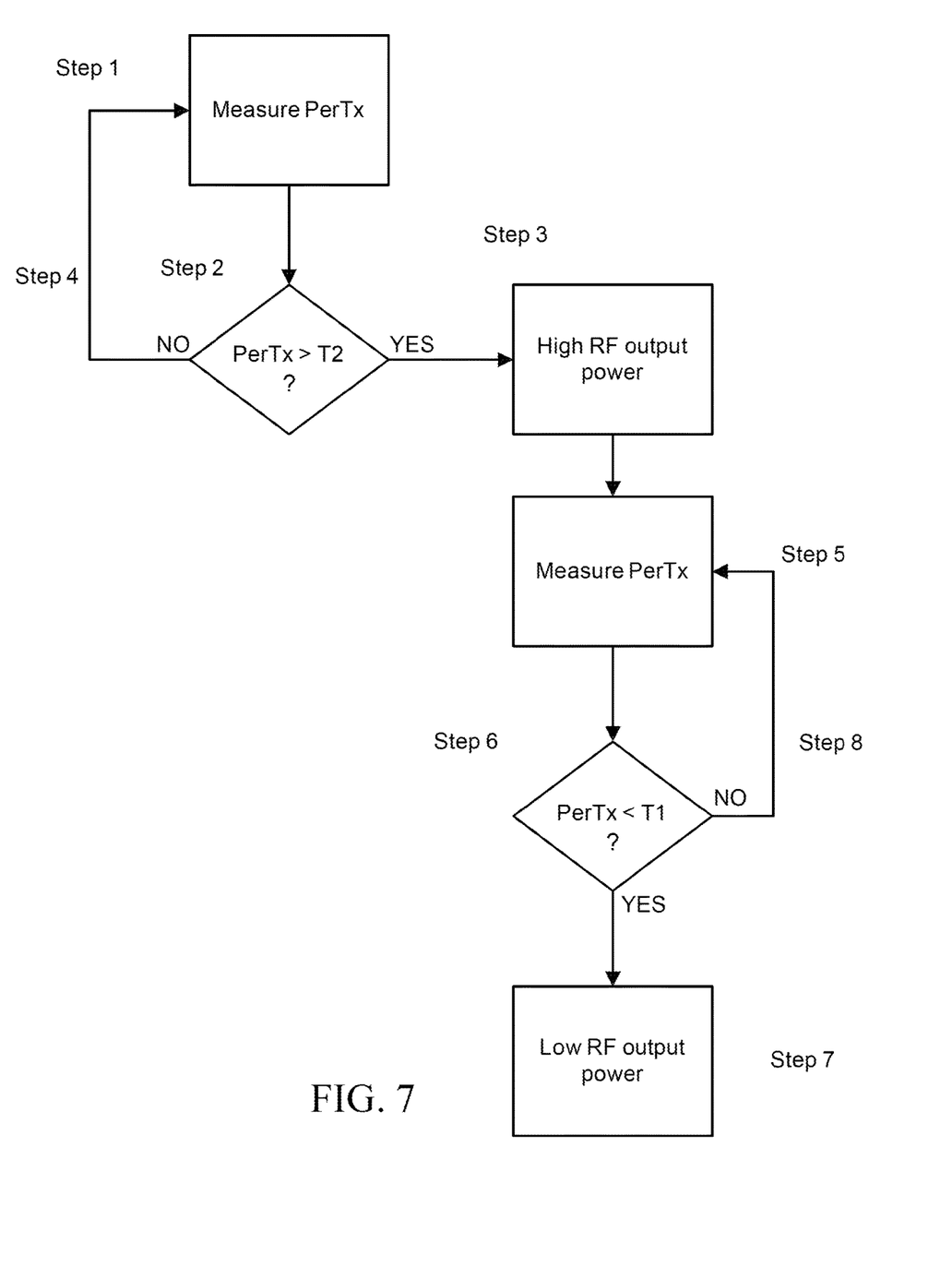
FIG. 7 is a flowchart illustrating a process of automatic control of the transmit power of the hearing device in the hearing system of FIG. 1, according to an embodiment.

As illustrated in FIG. 7, in Step 1, the processor 23 of the transceiver 26' measures the outgoing packet error rate PerTx.

In Step 2, the processor 23 of the transceiver 26' checks whether the outgoing packet error rate PerTx is above a threshold T2.

In Step 3, if the outgoing packet error rate PerTx is above the threshold T2, the processor 23 of the transceiver 26' enters a high RF output power state.

In Step 4, if the outgoing packet error rate PerTx is not above the threshold T2, the processor 23 of the transceiver 26' measures again the outgoing packet error rate PerTx in Step 1.

In Step 5, during the high RF output power state, the processor 23 of the transceiver 26' measures again the outgoing packet error rate PerTx, and in Step 6, the processor 23 of the transceiver 26' checks whether the outgoing packet error rate PerTx is below another threshold T1, which is lower than the threshold T2. If the outgoing packet error rate PerTx is below the threshold T1, in Step 7 the processor 23 of the transceiver 26' enters the low RF output power state.

In Step 8, when the outgoing packet error rate PerTx is not below the threshold T1, the process continues with the processor 23 of the transceiver 26' measuring again the outgoing packet error rate PerTx in Step 5.

The process illustrated in FIG. 7 can be seen as a two-step regulation loop.

The thresholds T1 and T2 can determine the usage or non-usage of the high transmit power mode. T1 and T2 can preferably be selected such that the audio quality stays good. Accordingly, T2 can be preferably selected to be smaller than T3, with a value for T2 of 15%, for example.

T1 can be selected to be smaller than T2, preferably with a value for T1 of 5%.

A variation of the embodiment illustrated in FIG. 7 could be for the processor 23 of the transceiver 26' to select a transmit power that is computed using a fine grain regulation loop algorithm that increases or decreases the transmit power, such as to reach a target value for the link quality metric.

Another embodiment is a combination of the two embodiments described above and illustrated in FIGS. 6 and 7.

Figure 8:
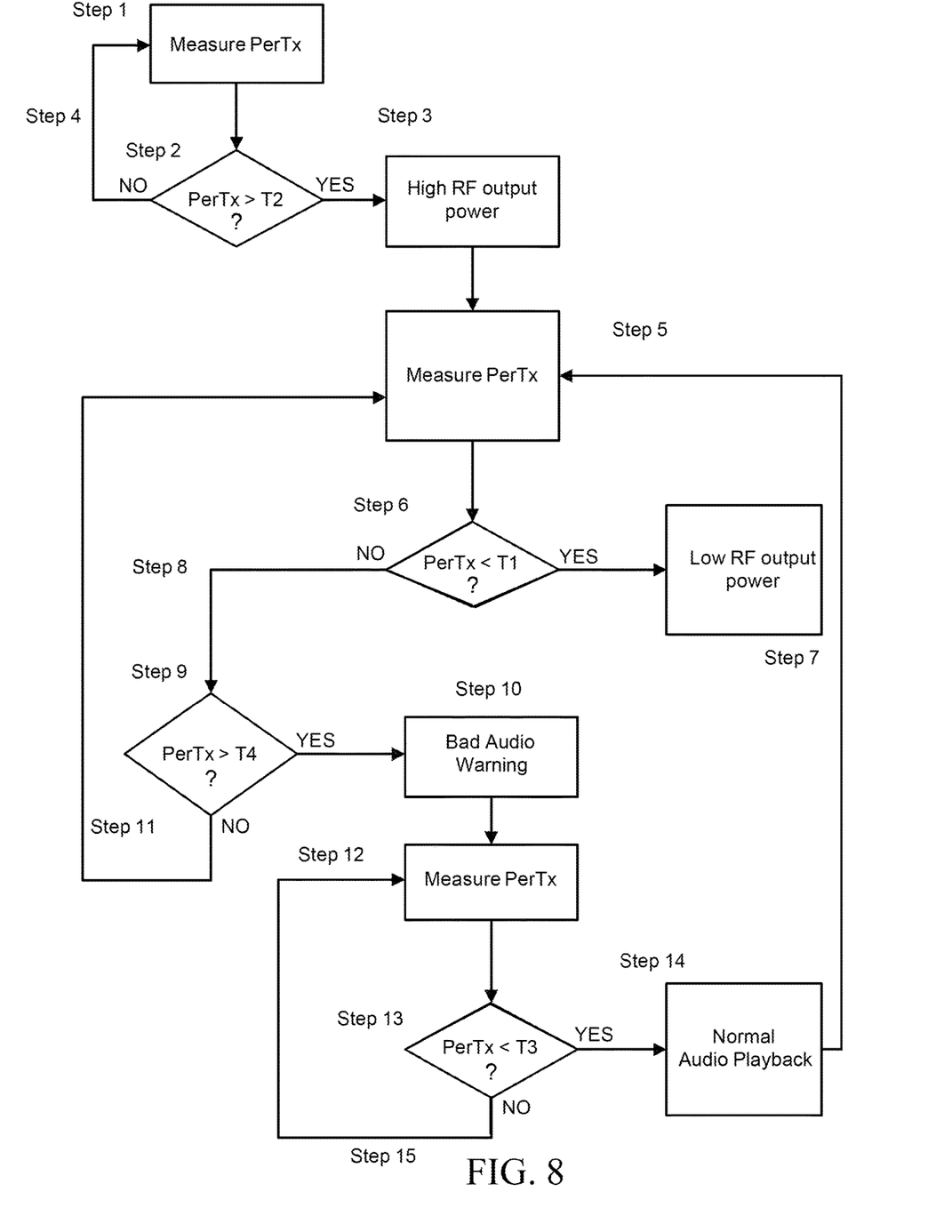
FIG. 8 is a flowchart illustrating a combined process of notifying the user of a bad audio link and automatic control of the transmit power of the hearing device, according to an embodiment.

As illustrated in FIG. 8, in Step 1, the transceiver 26' measures the outgoing packet error rate PerTx.

In Step 2, the transceiver 26' checks whether the outgoing packet error rate PerTx is above a threshold T2.

In Step 3, if the outgoing packet error rate PerTx is above the threshold T2, the processor 23 of the transceiver 26' enters a high RF output power state.

In Step 4, if the outgoing packet error rate PerTx is not above the threshold T2, the processor 23 of the transceiver 26' measures again the outgoing packet error rate PerTx in Step 1.

In Step 5, during the high RF output power state, the processor 23 of the transceiver 26' measures again the outgoing packet error rate PerTx, and in Step 6, the processor 23 of the transceiver 26' checks whether the outgoing packet error rate PerTx is below a threshold T1, which is lower than the threshold T2. If the outgoing packet error rate PerTx is below the threshold T1, in Step 7 the processor 23 of the transceiver 26' enters the low RF output power state.

In Step 8, when the outgoing packet error rate PerTx is not below the threshold T1, the process continues in Step 9 with the processor 23 of the transceiver 26' checking whether the outgoing packet error rate PerTx is above T4.

In Step 11, if the outgoing packet error rate PerTx is not above the threshold T4 (e.g., if the outgoing packet error rate PerTx is below or equal to the threshold T4), the process continues with the processor 23 of the transceiver 26' measuring again the outgoing packet error rate PerTx in Step 5 and follows the same steps described above.

In Step 10, if the outgoing packet error rate PerTx is above threshold T4, the processor 22' starts generating a bad audio warning to the user. Alternatively, the bad audio warning may be generated by the processor 23 of the transceiver 26'. The processor 23 of the transceiver 26' then measures again the outgoing packet error rate PerTx in Step 12 and in Step 13, checks whether the outgoing packet error rate PerTx is below another threshold T3 (good audio threshold), which is lower than the bad audio threshold T4. If the outgoing packet error rate PerTx is below the good audio threshold T3, in Step 14 the processor 23 of the transceiver 26' resumes normal audio playback. Because in Step 14, the RF power is still high the process continues with the processor 23 of the transceiver 26' measuring again the outgoing packet error rate PerTx in Step 5 and follows the same steps described above.

In Step 15, when the outgoing packet error rate PerTx is not below the threshold T3, the process continues with the processor 23 of the transceiver 26' measuring again the outgoing packet error rate PerTx in Step 12.

The bad audio warning can be either a notification to the user of the bad outgoing audio link by playing one or more warning beeps (e.g., a beep sequence), or artificially degrading the incoming audio link quality, or muting the incoming audio. The goal of all of these warnings is to notify the user that the wireless link 20 is weak, which should prompt the user to bring the mobile phone 12 closer to the hearing device 14. The beep notification can be explicit, while the degrading and/or muting the incoming audio link quality can be intuitive. Although the PerTx measurement is made on the hearing device that is connected bi-directionally with the mobile phone (e.g., the first hearing device 14), the notification about bad audio state can be made on both hearing devices, for example, by using a message transmitted via the wireless link 28 between the first and the second hearing devices that triggers the notification (as shown in FIG. 1).

The thresholds T1, T2, T3, and T4 can be selected in the same manner described above with reference to the embodiments illustrated in FIGS. 6 and 7, with preferably the following values respectively, 5%, 15%, 20% and 32%.

The methods of the embodiments described above applies to an Enhanced Synchronous connection-oriented ("eSCO") link or a wireless link that uses the eSCO transport option of the Bluetooth specification. With Synchronous connection-oriented ("SCO") links (e.g., where each device transmits encoded voice data in a reserved timeslot or a reserved frame, without retransmits), it may not be possible to reliably estimate the transmit Tx link quality. Enhanced SCO (eSCO) links allow greater flexibility in that they may use retransmissions to achieve reliability, allow a wider variety of packet types, and greater intervals between packets than SCO, thus increasing radio availability for other links.

In this embodiment, the PerTx estimation can be based only on the first transmit attempt of every eSCO frame, and can include the following steps:

At the establishment of an eSCO link, the processor 23 of the transceiver 26' can set the following values for the outgoing packet error rate PerTx and the bad HFP transmit link:

PerTx=0 hfpTxLinkBad=0

After every eSCO frame (i.e., every 3.75 ms), the processor 23 of the transceiver 26' can retrieve transmit count (txCnt) and receive count (rxCnt), which indicate how many attempts have occurred to transmit and receive an audio frame, respectively.

The processor 23 of the transceiver 26' can then check whether no header has been received or both rxCnt and txCnt are >1 (i.e., whether neither the first reception nor the first transmit attempt was successful):

If true (i.e., no header has been received or both rxCnt and txCnt are >1), the processor 23 of the transceiver 26' can set the value for the transmit error txError to 1.

If false, the processor 23 of the transceiver 26' can set txError to 1 if txCnt>1 (i.e., the first transmit attempt was not successful) or to 0 otherwise.

The processor 23 of the transceiver 26' can then update PerTx using the formula PerTx=min((1−1/256)*PerTx+1/256*txError; T4)

The value PerTx can be saturated at the threshold value T4 via the function min(X; T4), such that the time needed to reach the good audio state when the link is good again is fixed.

The methods of the embodiments described above can apply to a wireless link that uses the isochronous transport option of the Bluetooth specification. For certain communication links, only a limited amount of delay is allowed and retransmissions are allowed up to a certain limit at which the current payload must be disregarded and the next payload must be considered. This data transfer is known as isochronous traffic. In other words, the retransmit process must be overruled in order to continue with the next data payload. Aborting the retransmit scheme can be accomplished by flushing the old data and forcing the Bluetooth controller to take the next data instead.

The packet error rate estimate PerTx can be implemented using an exponential moving speed average according to the formula PerTx(k)=(1−a)*PerTx(k−1)+a*txError, where "a" is the degree of weighting decrease; and txError takes the value 1 if a transmitted packet is observed to have been lost and the value 0 if a transmitted packet is observed to have been received. The variable "a" sets the moving average speed. This parameter can be chosen as a trade-off between speed of bad link detection and accuracy of measurement. The value a=1/256 can be selected to provide a detection time that is close to one second, but not exceeding one second. This selection can provide the highest accuracy while not being too slow.

In certain embodiments, the audio link quality may be estimated via Received Signal Strength Indicator ("RSSI"). Specifically, instead of keeping statistics of the effective errors on the outgoing audio link, the signal strength of the incoming audio link can be measured and the expected audio link quality can be deduced on the outgoing link.

Other embodiments can monitor the incoming audio link. For example, the incoming audio quality may be monitored via packet error statistics. A notification can be transmitted to the user when the audio quality is bad in either or in both the incoming and outgoing directions.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be desirable to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A hearing device comprising:
   a processor; and
   a wireless transceiver operatively connected with the processor, the wireless transceiver being configured to connect via a wireless link with at least one remote device, being configured to exchange bi-directional audio packets with the remote device over a Bluetooth transport, and being configured to provide a transmit count and/or a successful receive count indicating how many attempts have occurred to transmit and receive audio packets, respectively, wherein:
   a transmit power of the remote device is larger than a transmit power of the hearing device, and
   the processor is configured to:
      use the transmit count and/or the successful receive count provided by the transceiver to estimate an outgoing audio link packet error rate of a transmission from the hearing device to the at least one remote device via the wireless link, and
      increase a transmit power of the hearing device when the outgoing audio link packet error rate exceeds a first pre-determined threshold, and
   wherein the Bluetooth transport is isochronous and the wireless transceiver is configured to provide a transmit count and/or a successful receive count after every isochronous interval.

2. The hearing device according to claim 1, wherein the processor is part of the wireless transceiver.

3. The hearing device according to claim 1, wherein the wireless link follows a Hands-Free Profile ("HFP") of the Bluetooth specification.

4. The hearing device according to claim 1, wherein the wireless link is configured to use an Enhanced Synchronous connection-oriented ("eSCO") transport option of the Bluetooth specification or another isochronous transport option of the Bluetooth specification.

5. The hearing device according to claim 1, wherein the audio link packet error rate is estimated by monitoring a number of necessary retransmissions from the hearing device towards the remote device.

6. The hearing device according to claim 1, wherein the audio link packet error rate is estimated by monitoring acknowledgements transmitted by the remote device related to audio packets received by the remote device.

7. A hearing device comprising:
   a processor; and
   a wireless transceiver operatively connected with the processor, the wireless transceiver being configured to connect via a wireless link with at least one remote device, being configured to exchange bi-directional audio packets with the remote device over a Bluetooth transport, and being configured to provide a transmit count and/or a successful receive count indicating how many attempts have occurred to transmit and receive audio packets, respectively, wherein:
   the processor is configured to:
      use the transmit count and/or the successful receive count provided by the transceiver to monitor an outgoing audio link packet error rate, and
      increase a transmit power of the hearing device when the outgoing audio link packet error rate exceeds a first pre-determined threshold, and
   wherein the Bluetooth transport is isochronous and the wireless transceiver is configured to provide a transmit count and/or a successful receive count after every isochronous interval.

8. The hearing device according to claim 7, wherein the processor is part of the wireless transceiver.

9. The hearing device according to claim 7, wherein the remote device is at least one of a mobile phone, a Digital Enhanced Cordless Telecommunications ("DECT") phone, a landline phone, a tablet, or a computer.

10. A method for controlling an audio quality in a hearing device comprising a processor and a wireless transceiver operatively connected with the processor, the wireless transceiver being configured to connect via a wireless link with a remote device, the method comprising:
   providing a transmit count and/or successful receive count,
   using the transmit count and/or the successful receive count provided by the transceiver to estimate an outgoing audio link packet error rate of a transmission via the wireless link, and
   increasing a transmit power of the hearing device when the outgoing audio link packet error rate exceeds a first pre-determined threshold,
   wherein the wireless transceiver is configured to exchange bi-directional audio packets with the remote device over a Bluetooth transport, and
   wherein the Bluetooth transport is isochronous and the wireless transceiver is configured to provide a transmit count and/or a successful receive count after every isochronous interval.

11. The method according to claim 10, wherein estimating the audio link packet error rate comprises monitoring a number of necessary retransmissions from the hearing device towards the remote device or monitoring acknowledgements transmitted by the remote device related to the audio packets received by the remote device from the hearing device.

12. The method according to claim 10, further comprising:
generating and sending a notification when the audio link packet error rate exceeds a pre-determined threshold.

13. The method according to claim 12, wherein the notification comprises at least one of a single beep, a beep sequence, artificially degrading an incoming audio quality, or muting incoming audio.

14. A method for controlling an audio quality in a hearing device comprising a processor and a wireless transceiver operatively connected with the processor, the wireless transceiver being configured to connect via a wireless link with a remote device, the method comprising:

providing a transmit count and/or successful receive count,
estimating an outgoing audio link packet error rate of a transmission from the hearing device to the at least one remote device via the wireless link based on the transmit count and/or the successful receive count, and
increasing a transmit power of the hearing device when the outgoing audio link packet error rate exceeds a first pre-determined threshold,
wherein the wireless transceiver is configured to exchange bi-directional audio packets with the remote device over a Bluetooth transport, and
wherein the Bluetooth transport is isochronous and the wireless transceiver is configured to provide a transmit count and/or a successful receive count after every isochronous interval.

15. The method according to claim 14, wherein the notification comprises at least one of a single beep, a beep sequence, artificially degrading an incoming audio quality, or muting incoming audio.

* * * * *